US006923455B2

(12) United States Patent
Sullivan

(10) Patent No.: US 6,923,455 B2
(45) Date of Patent: Aug. 2, 2005

(54) TWO-HANDLED SNOW SCOOTER

(76) Inventor: Daniel J. Sullivan, P.O. Box 478, South Lyme, CT (US) 06376

(*) Notice: Subject to any disclaimer, the term of this patent is extended or adjusted under 35 U.S.C. 154(b) by 2 days.

(21) Appl. No.: 10/370,663

(22) Filed: Feb. 20, 2003

(65) Prior Publication Data

US 2004/0007837 A1 Jan. 15, 2004

Related U.S. Application Data

(60) Provisional application No. 60/360,041, filed on Feb. 27, 2002.

(51) Int. Cl.[7] ................................................ A63C 5/06

(52) U.S. Cl. ................................................ 280/14.27

(58) Field of Search .......................... 280/14.27, 655.1, 280/637, 14.21, 14.22, 14.28, 28.11, 28.14, 842, 87.041, 809; 441/68, 74

(56) References Cited

U.S. PATENT DOCUMENTS

| | | | | |
|---|---|---|---|---|
| 1,330,644 A | | 2/1920 | Matson | |
| 1,644,623 A | | 10/1927 | Ahn | |
| 1,968,975 A | | 9/1934 | Upsacker et al. | |
| 2,101,229 A | | 12/1937 | Anderson et al. | |
| 2,497,995 A | | 2/1950 | Julie | |
| 2,894,760 A | | 7/1959 | Kolstad | |
| 3,269,742 A | | 8/1966 | Funyak et al. | |
| 3,529,847 A | * | 9/1970 | Shores | 280/14.22 |
| 4,129,313 A | * | 12/1978 | Benson | 280/14.27 |
| 4,357,036 A | * | 11/1982 | Zepkowski | 280/809 |
| 4,533,150 A | * | 8/1985 | Hardy | 280/14.28 |
| 4,708,353 A | | 11/1987 | Evequoz | |
| 4,744,584 A | * | 5/1988 | Monreal | 280/606 |
| 5,397,154 A | * | 3/1995 | Baldwin | 280/818 |
| 5,411,282 A | | 5/1995 | Shannon | |
| 5,516,126 A | * | 5/1996 | Myers | 280/14.28 |
| 6,139,031 A | * | 10/2000 | Wingard | 280/14.28 |
| 6,290,260 B1 | * | 9/2001 | Brill | 280/809 |
| 6,321,470 B2 | * | 11/2001 | Zazzi | 36/132 |
| 6,634,657 B2 | * | 10/2003 | Graham | 280/14.27 |
| 2001/0038184 A1 | | 11/2001 | Stafford | |
| 2002/0030333 A1 | * | 3/2002 | Graham | 280/14.27 |
| 2002/0060436 A1 | | 5/2002 | Spiers | |
| 2002/0121752 A1 | | 9/2002 | Gille et al. | |
| 2003/0067127 A1 | * | 4/2003 | McClure et al. | 280/14.28 |
| 2003/0178803 A1 | * | 9/2003 | Killian | 280/87.041 |
| 2003/0209901 A1 | * | 11/2003 | Hamel | 280/809 |

* cited by examiner

*Primary Examiner*—J. Allen Shriver
(74) *Attorney, Agent, or Firm*—McCormick, Paulding & Huber LLP

(57) ABSTRACT

An apparatus is attachable to a conventional snowboard to convert the snowboard into a snow scooter having improved performance characteristics in comparison to those of the snowboard alone. The apparatus includes two handle assemblies attached to the front and rear portions of the snowboard and including respectively front and rear pole-like handles fixed to and extending upwardly from the snowboard during riding of the scooter. A rider standing on the middle portion of the snowboard and grasping the two handles can exert twisting, bowing, and other forces on the snowboard through the handles allowing him or her to ride the scooter without the use of foot bindings binding his feet to the scooter.

6 Claims, 3 Drawing Sheets

TWO-HANDLED SNOW SCOOTER

CROSS REFERENCE TO RELATED APPLICATIONS

This application is a nonprovisional application claiming an invention disclosed in prior U.S. Provisional Application No. 60/360,041 filed on Feb. 27, 2002, and name of the inventor is the same as one of the named inventors in said provisional application, whose invention is claimed in the claims of this application. The benefit of the Feb. 27, 2002 filing date of the provisional application is claimed for this nonprovisional application and the content of said provisional application is hereby incorporated into this application by reference.

FIELD OF THE INVENTION

This invention relates to a snow sport device, referred to herein as a "snow scooter", which device is comprised of a snowboard, which may be of conventional design, and an apparatus attached to the snowboard giving the board enhanced performance capabilities in comparison to the board as used by itself. Since the snow scooter of the invention may often be formed by the seller or user of the scooter combining a snowboard acquired from one source and an apparatus acquired from another source, the following combination claims are drawn to the apparatus by itself; but the invention resides also in snow scooters as made by attaching the claimed apparatus to snowboards.

GLOSSARY

As used herein, various skiing and snowboarding terms have the following meanings:

Slope

An inclined surface such as the side of a hill or mountain.

Ski Slope

A slope, normally clear of obstacles, for skiers and snowboarders to descend.

Snowboarder

The operator or "rider" of a snowboard or of the snow scooter of this invention.

Fall Line

An imaginary line running from the top of a ski slope to the bottom of the ski slope. If a bowling ball were allowed to freely roll down a ski slope the ball would follow a track along the fall line. The fall line may also be defined as the line which describes the shortest distance from the top of a slope the to bottom of the slope.

Uphill

The direction toward the top of the slope.

Downhill

The direction toward the bottom of the slope.

Traverse

The act of moving across a slope from one side toward the other side at an angle to the fall line which angle is greater than zero degrees (directly down the fall line) and less than 180 degrees (directly up the fall line).

Uphill Edge

When traversing across a slope with a snowboard, the edge of the snowboard on the uphill side of the snowboard. When traversing the uphill edge of the snowboard normally exerts more pressure on the snow surface than does the downhill edge.

Downhill Edge

When traversing a slope, the edge of the snowboard on the downhill side of the snowboard.

Weighted Edge

The edge of the snowboard which is carrying the weight of the snowboard rider.

Unweighted Edge

The edge of the snowboard which is not carrying the weight of the snowboard rider.

BACKGROUND OF THE INVENTION proliferation of different brands of snowboards is available on the market today and the mode of operation is basically the same for all. Typically the snowboarder's feet are fastened securely to the snowboard by a set of two bindings, one forward and one aft, which attach by one means or another to the boots worn on the snowboarder's feet. The snowboarder's feet are in effect intimately "locked" to the snowboard through these bindings.

The sides of a traditional snowboard are curved in such a manner that the board is wider at its forward and rear position, and narrower at its middle or waist portion, similar to the construction of an alpine ski. This curvature of the sides of a ski or snowboard is known as "side camber" or "side cut". Side cut is the snowboard feature that allows the rider to maintain a turn in either direction. In general most snowboards are flexible both in bending along the longitudinal axis, as well as in torsion about the longitudinal axis. It is the torsional flexibility that allows the board to be twisted by using the feet to apply opposing forces through the bindings.

A snowboard rider normally stands on the board with his feet approximately perpendicular to the snowboard longitudinal axis. The angle of the feet relative to the snowboard may vary widely, but for most riders it is somewhere in the range between 0 and 45 degrees forward of perpendicular. The difference is a matter of rider preference, relating to comfort and performance. The snowboarder may also choose to ride the board with either his right foot forward or his left foot forward. To make the following discussion general, the two edges (sides) of the snowboard are referred to respectively, as the toe edge and the heel edge.

As with alpine skiing, turns on a snowboard can be executed in a number of ways; however, the four most common methods for turning are as follows:

Carving turn—by shifting weight and rocking the board onto one edge or the other, the rider can cause the snowboard to turn in the direction it is rocked, i.e. rocking to the right for a right turn, rocking to the left for a left turn. The "side cut" and flex of the snowboard combine to allow the snowboard to follow a curvilinear path when one curved edge of the snowboard is weighted and, as a result, cuts into the snow surface such that a turn is executed without slipping or sliding sideways across the snow surface.

Skidding turn—by twisting the snowboard (opposing heel and toe pressure), the rider can cause the front edge to bite, and the rear edge to release and slide.

Slipping turn—by twisting the snowboard (again opposing heel and toe pressure), the rider can cause the front edge to release and slide, and the rear edge to bite.

Jumping turn—by either jumping upwardly, or launching off a bump, the rider can get the snowboard off the snow, shift the snowboard in the air, then land in a new direction.

To propel a snowboard forward on flat surfaces or up slight grades it is necessary to release the rear foot from its binding and use it to push against the snow surface to slide the snowboard ahead. Generally the rear foot must also be released from its binding when riding up the chair lift such that the snowboard dangles from the front foot by its binding to the board.

When riding a snowboard in the traditional manner the rider's booted feet are securely fastened to the snowboard through a binding system. The rider's feet are fastened to the top surface of the snowboard at an angle which is typically within 45 degrees of being perpendicular to the longitudinal axis of the snowboard. Many riders set their bindings such that their feet are 90 degrees to the longitudinal axis of the board so that they can ride the snowboard either forwardly or backwardly with the same degree of ease. Consequently when a rider looses his balance he either falls forwardly onto his knees or backwardly onto his posterior.

To protect the knees and/or posterior the rider's natural instinct is to catch himself on his hands to brake the fall. Medical records show that the most common injuries to snowboarders are to the wrist, shoulders and rotator cuff. There is also an increasing incidence of lower leg, tibula and fibula, bone fractures due to the lack of snowboard safety bindings combined with the use of stiffer "ski type" plastic boots.

The object of the invention is to provide a means enabling the riding of a snowboard without having one's feet securely attached to the snowboard, so as to eliminate those falls and injuries that could arise as a result of having one's feet securely attached to the snowboard. A further object of the invention is to provide riders of snowboards with a different and more enjoyable riding experience, particularly for those riders who are uncomfortable with the traditional manner of riding a snowboard. A still further object of the invention is to provide an improved snowboard, herein referred to as a "snow scooter", which can be riden easily by a one legged rider or by a rider having one or two functionally impaired legs.

SUMMARY OF THE INVENTION

The present invention provides a means for a snowboarder to "ride", steer, or otherwise manipulate a snowboard without having his feet "locked" to the snowboard through the traditional binding system. The present invention resides in an apparatus which can be attached to a traditional snowboard to convert that traditional snowboard into an improved snowboard, or snow scooter, including a means for permitting the rider to control and maneuver the snowboard in the same manner as though his feet were attached to it. In particular the apparatus of the invention, when in a condition of being attached to a snowboard, includes two pole like handles attached respectively to the front and rear portions of the snowboard, so as to extend upwardly from the snowboard, which handles are graspable by the two hands of a rider positioned at the middle portion of the board, so that by applying hand forces to the handles the rider can twist the front and rear portions of the snowboard relative to one another about the longitudinal axis of the snowboard or can lift upwardly or press downwardly on the handles to apply lifting or downwardly pressing forces to the front and rear portions of the snowboard.

BRIEF DESCRIPTION OF THE DRAWINGS

The detailed descriptions of embodiments of the invention which follow will be better understood when taken in conjunction with the accompanying drawings, wherein.

DETAILED DESCRIPTION OF THE PREFERRED EMBODIMENTS

Figure 1:
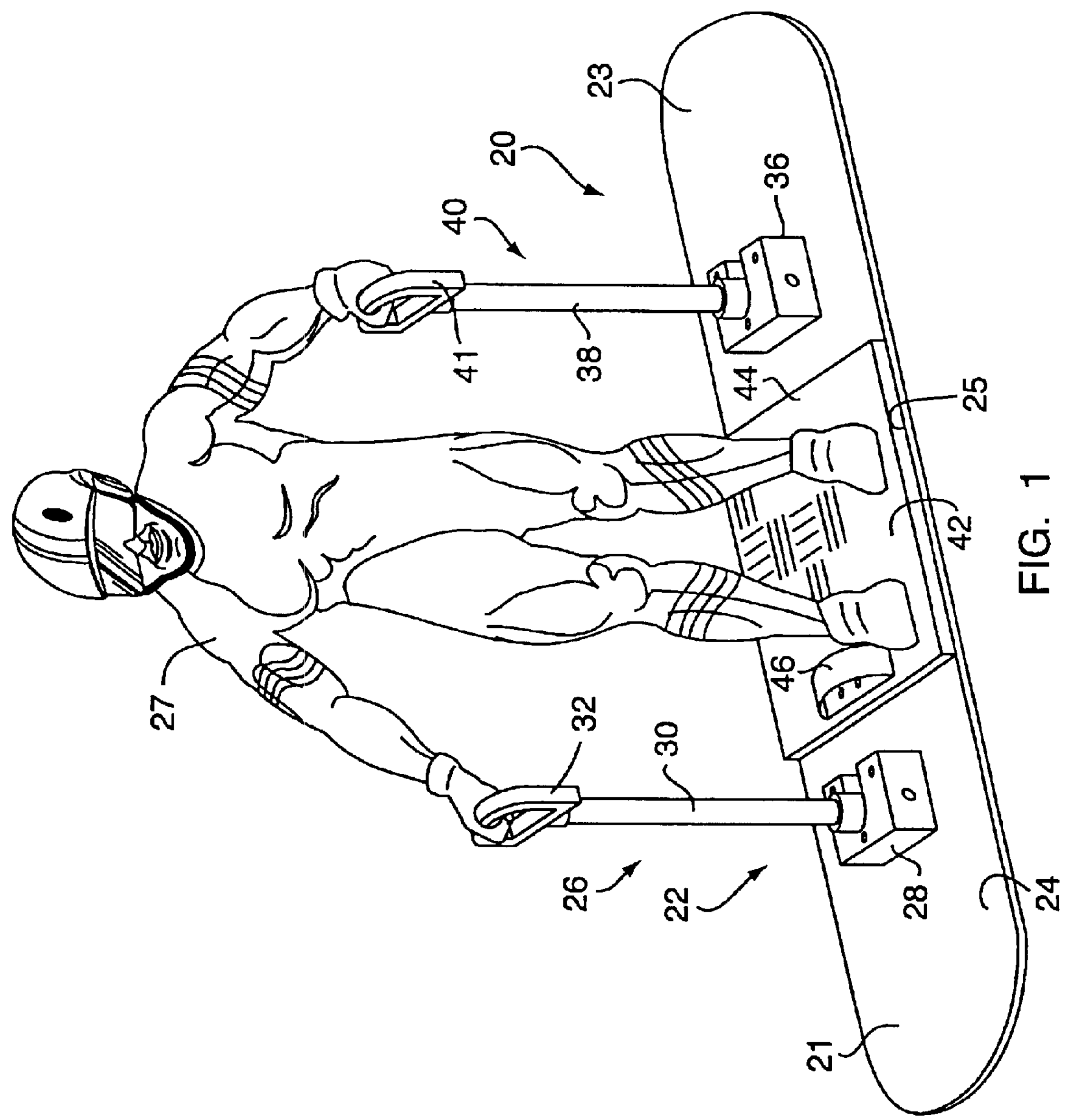
FIG. 1 is a perspective view of a snow scooter embodying the invention in the process of being ridden by a rider.
Figure 2:
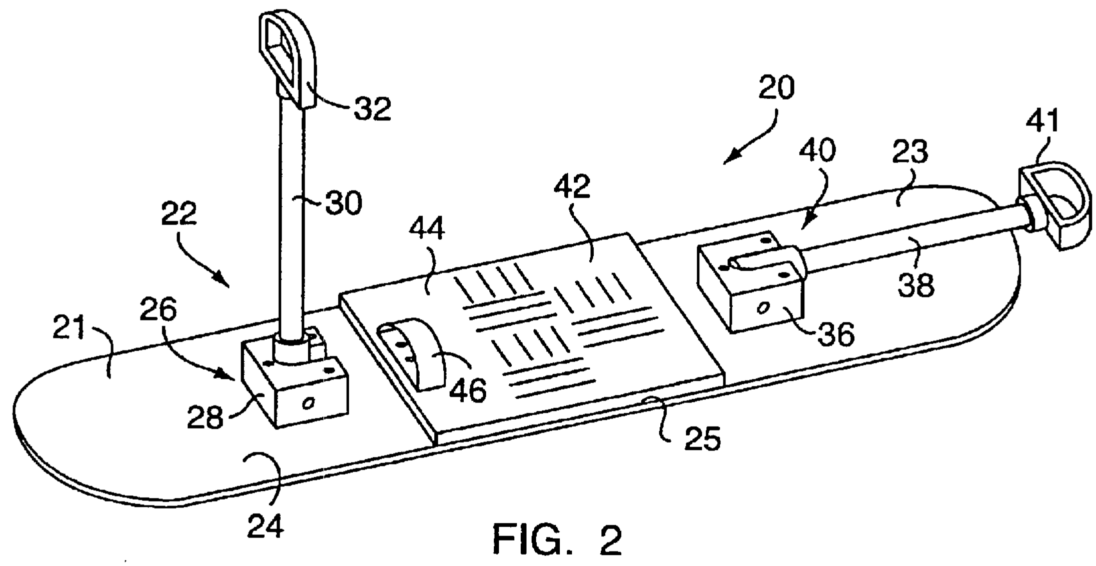
FIG. 2 is a perspective view of the snow scooter of FIG. 1 shown in a partially folded or stowed condition for riding a chair lift.
Figure 3:
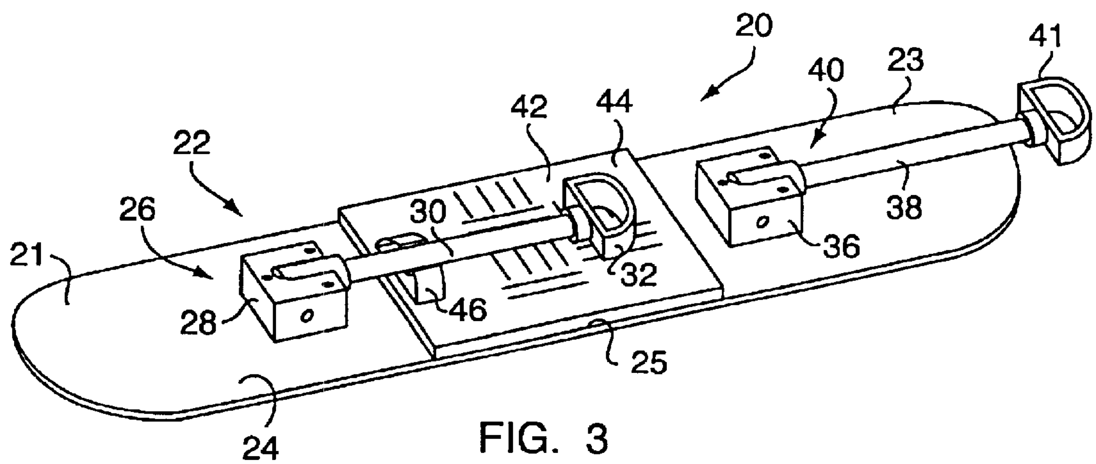
FIG. 3 is a perspective view of the snow scooter of FIG. 1 shown in a fully collapsed condition for transport.

Referring first to FIGS. 1 to 3, the invention involves a snow scooter 20 made up of an apparatus 22 and a snowboard 24, which snowboard 24 may be of generally conventional construction. In the illustrated case the apparatus 22 mounts onto the snowboard 24 utilizing both the front and rear sets of factory installed binding mounting holes with threaded inserts. The snowboard 24 has a front portion 21, a rear portion 23, and a middle portion 25. During use of the snow scooter 20 a rider 27 positions himself on the middle portion 25. Usually it is expected that the rider 27 will stand, as shown in FIG. 1, in the middle portion 25 with his two feet generally perpendicular to the longitudinal axis of the snowboard 24.

The apparatus 22 is comprised of two major components:

A foremost component attached to the snowboard 24 utilizing the front-most set of existing mounting holes, hereinafter referred to as a "front handle assembly" 26. The front handle assembly 26 consists of a base plate 28 which mounts directly to the board using threaded fasteners, and a front handle or pole 30. During use of the scooter 20 the handle 30 extends vertically upwardly from the snowboard and is fixed in all directions against movement relative to the snowboard. At its upper end the handle 30 has a hand grip 32 which may take various shapes but which is preferably of a ring shape or D-shape as shown.

A rearmost component attached to the snowboard 24 utilizing the rear-most set of existing mounting holes in the snowboard, and referred to as the "rear handle assembly 40". The rear handle assembly 40 comprises a base plate 36 which mounts directly to the snowboard using threaded fasteners, and a rear handle 38. The rear handle 38 is similar to the front handle 30 in that during use of the scooter it extends upwardly from the snowboard and has a D-shaped hand grip 41 at its upper end, with the handle 38 being fixed against movement in all directions relative to the snowboard 24.

The apparatus 22 also advantageously includes other components facilitating use of the scooter. Two of these other components are shown in FIGS. 1 to 3 and are a foot board or pad 42, having an anti-skid top surface 44, which can be attached by any convenient known way to the top surface of the middle portion 25 of the snowboard, and a strap 46 into which the toe of one of the rider's boots can be inserted to carry the scooter from the rider's foot during the riding of a chair lift. Still other advantagous components are a tether and suitable connectors for connecting the tether between the rider and the snowboard to prevent the snowboard from moving far from the rider in the event of a fall, and a shorter tether and connectors for keeping the snowboard close to the rider in the event the scooter falls from the rider's foot during a chair lift ride. A mechanism can also be added to the snowboard for causing the scooter to assume a non-running attitude in the event of the rider falling from the scooter.

It is important that the snow scooter rider maintain secure footing while operating the scooter. To achieve this, snow scooter's foot middle portion 25 is preferably equipped as mentioned with a high friction anti-skid surfaced board sheet or layer such as the pad 42, bonded or otherwise secured to the top surface of the snowboard in the area where the rider's feet are placed during operation of the snow scooter. The friction surfaced board, sheet or layer is made of material with a textured anti-skid surface or from a high friction high density foam plastic or rubber material. The friction surfaced board, sheets or layers may be designed as two separate foot pads for the two feet of the rider. The anti-skid member or members is or are designed to shed snow while providing good traction between the rider's booted feet and the snowboard 24 so that the rider's feet do not slip or slide on the snowboard in a manner such as to inhibit good operation of the snow scooter.

The two handles 30 and 38 during use of the snow scooter 20, as seen in FIG. 1, extend generally upwardly from the snowboard 24, and at the lower ends are held by the front base plate 28 and rear base plate 36 against all movement relative to the snowboard 24. Therefore by grasping the hand grips 32 and 4041 the handles 36 and 38 can be pushed by the rider to one or the other side of the snowboard by the rider 27 to apply corresponding forces to the front and rear portions 21 and 23 of the snowboard tending to move the front and rear portions torsionally about the longitudinal axis of the snowboard.

Figure 4:
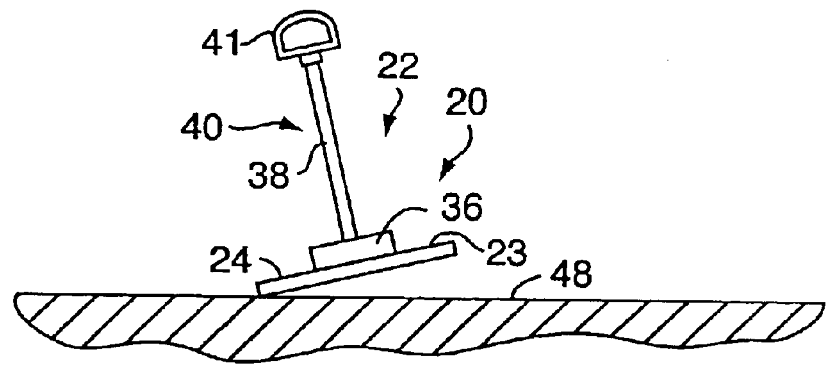
FIG. 4 is a schematic rear end view of the snow scooter of FIG. 1 shown with both handles pushed toward the same side of the snowboard.

If the two handles 30 and 38 are pushed toward the same side of the snowboard (that is in complementary directions) the tendency will be, as shown in FIG. 4, to cause one edge—the edge toward which the handles are pushed—to bite more aggressively into the snow 48 while lifting or at least somewhat unweighting the other edge from the snow. In FIG. 4 only the rear handle 38 is shown, as the front handle 30 is aligned with and therefore hidden by the rear handle.

Figure 5:
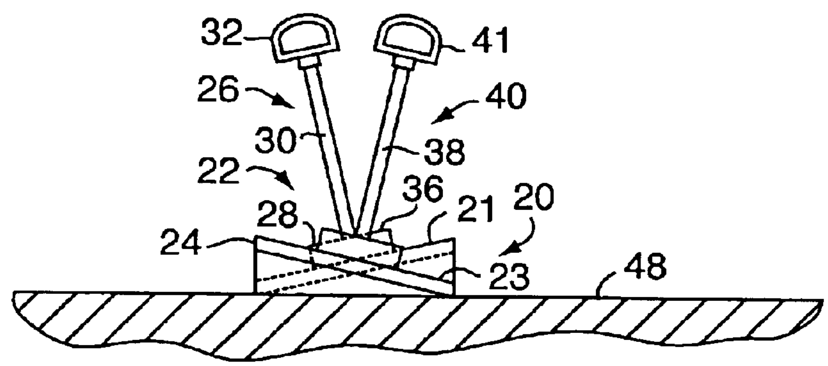
FIG. 5 is a view similar to FIG. 4 but showing the two handles pushed toward opposite sides of the snowboard while on a level snow surface.

If the two handles are pushed toward opposite sides of the snowboard (that is, in opposing directions) the tendency will be to twist the front and rear portions of the snowboard relative to the other about the longitudinal axis of the snowboard. Therefore, at the front portion 21 and the rear portion 23 one edge will tend to bite more aggressively into the snow and the opposite edge will shift toward becoming unweighted, but the biting edge of the front portion will be on the opposite side of the snowboard from the biting edge of the rear portion. For example, FIG. 5 shows the rear handle 38 pushed to the right (as seen in FIG. 5) and the front handle 36 pushed to the left while riding on a level surface of snow. In this case the left edge of the front portion and the right edge of the rear portion bite onto the snow while the left edge of the rear portion and the right edge of the front portion tend to lift from the snow or to carry less weight.

In addition to rocking the handles 30 and 38 toward the sides of the snowboard they can also be rocked forwardly and backwardly or can be pulled up or pushed downwardly by the rider to bend the snowboard in different ways about axes perpendicular to the snowboard and/or to achieve different distributions of the rider's weight along the length of the snowboard.

Figure 6:
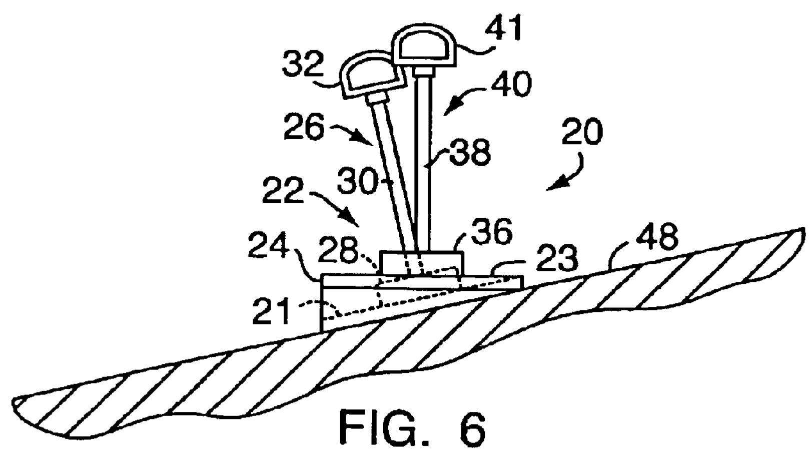
FIG. 6 is a view similar to FIG. 5 but showing the scooter on an inclined snow surface.

FIG. 6 shows the same condition as FIG. 5 except for the scooter now being on a hill or inclined snow surface. In this case the rear uphill (right) edge of the snowboard lifts onto the snow while the front uphill edge is released (unweighted). Thus the front of the snowboard will slide more easily downhill then the rear of the snowboard, causing the snowboard to turn in the downhill direction.

That is, the two handles 30 and 38 can be used to exert complementary torsional forces to the snowboard or opposing, counter, torsional forces, to the snowboard. Complementary torsional forces are applied to rock the snowboard up onto one of its curved edges to initiate a "carved" turn. Counter torsional forces are applied 1) to "set" one portion of the snowboard's steel edge causing the edge to bite into the snow surface and 2) to release the remaining portion of the snowboard's steel edge allowing that portion of the snowboard to slide or skid sideways initiating a skidding turn. The two handles may also be pulled towards each other which causes the snowboard to "bow" flexing the middle of the board down and the ends up. This action facilitates turning the board about its vertical axis by providing a smaller contact area about which to spin or turn the board. Bowing of the board combined with complementary torsional forces to rock the board to one side of the other is also an effective means of turning the snow scooter in deep powder snow or on a soft snow surface.

With the handles 30 and 38 in their upright positions the scooter 20 may be cumbersome to transport while riding a chair lift, in a car or otherwise. Therefore, each of the handles 30 and 38 is preferable designed with a hinged connection to the base plate 28 or 36 such that the handle may be folded down to a position parallel with the top surface of the snowboard, as shown in FIGS. 2 and 3. This is a desirable feature which makes it more convenient to transport the snow scooter on a chair lift and to and from ski slopes.

In FIG. 2 the rear handle 38 is shown in a folded position with the front handle 30 remaining upright. In this condition the scooter 20 can be conveniently carried by the rider while riding a chair lift. To facilitate this carrying of the scooter, the scooter preferably includes the toe strap 46 fastened to the snowboard, at a point slightly behind the front base plate 28, into which the toe of one of the rider's boots can be easily inserting to hang the scooter from the rider's foot.

In FIG. 3 both handles 30 and 38 are shown in folded positions which make the scooter more compact for transport in a car or otherwise.

Various different known mechanisms may be used for pivotally connecting the handles 30 and 38 to their respective base plates for movement in their upright and folded positions and for holding the handles fixed to the snowboard, by manually releasable means, while in their upright positions, and advantageously some shear pin or other overload release mechanism is provided to allow each handle to move out of its upright position in the event of an unduly high force being applied to it.

What is claimed is:

1. An apparatus for forming a snow scooter by attachment of the apparatus to a snowboard having front and rear portions and a middle portion between the front and rear portions onto which middle portion a rider is positioned during use of the snow scooter, said apparatus in a condition of its being attached to a snowboard such as aforesaid comprising:

a front handle assembly attached to the front portion of the snowboard and including a front handle which during riding of the scooter is fixable against all movement relative to the middle portion of the snowboard and extends vertically upwardly from the snowboard, said front handle having an upper end with a hand grip grippable by a hand of the rider standing on the middle portion of the snowboard, and a rear handle assembly attached to said rear portion of the snowboard and including a rear handle which during riding of the scooter is fixable against all movement relative to the snowboard and extends vertically upwardly from the snowboard, said rear handle having an upper end with a hand grip grippable by a hand of the rider standing on the middle portion of the snowboard.

2. An apparatus for forming a snow scooter as defined claim 1, wherein:

said front and rear handles during riding of said scooter extend upwardly from said front and rear portions of the snowboard respectively and are spaced apart from one another to allow a rider to be positioned between the front and rear handles and in the middle portion, of the snowboard with the two hands of the rider grasping respectively the two hand grips of the front and rear handles.

3. An apparatus for forming a snow scooter as defined in claim 1, wherein:

at least one of said handles is movable from said upwardly extending condition to a folded condition at which it is positioned generally parallel to the snowboard.

4. An apparatus as defined in claim 3, wherein:

both of said front and rear handles are movable to said folded condition.

5. An apparatus as defined in claim 1, wherein:

said apparatus includes a toe strap attached to the snowboard for loosely receiving the toe of a boot of a rider while the rider is riding a chair lift.

6. An apparatus as defined in claim 1, wherein:

said apparatus includes at least one member with an anti-skid top surface attached to the snowboard to inhibit sliding of the rider's feet relative to the snowboard.

* * * * *